United States Patent Office 3,336,522
Patented Aug. 15, 1967

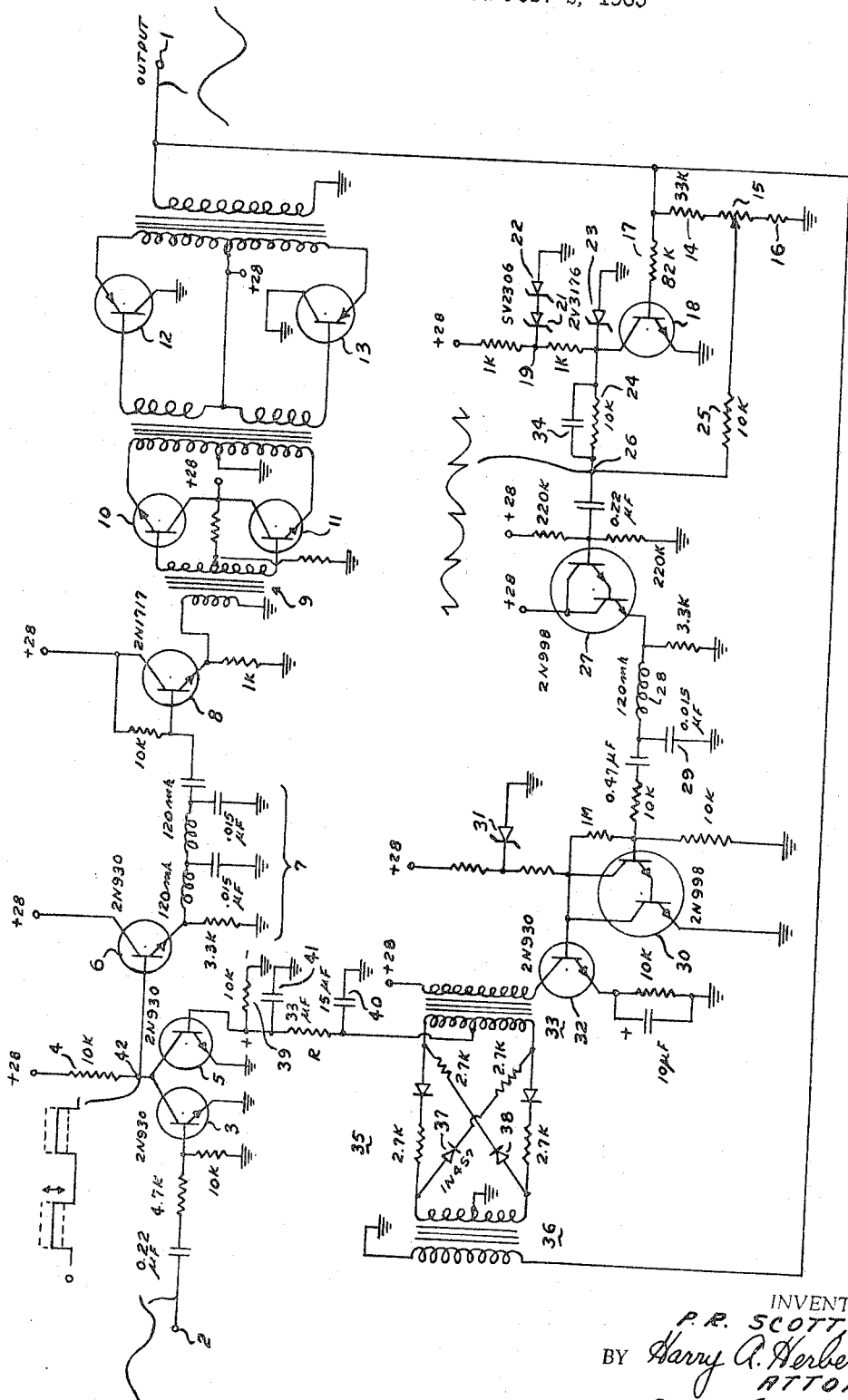

3,336,522
REGULATED SINUSOIDAL A.C. POWER SUPPLY
Philip R. Scott, Jr., Sudbury, Mass., assignor to the United States of America as represented by the Secretary of the Air Force
Filed Feb. 2, 1965, Ser. No. 429,936
2 Claims. (Cl. 321—18)

The purpose of this invention is to provide a regulated alternating current power supply, particularly for the higher frequencies, capable of holding the output voltage substantially constant over a wide range of load variation, exciting voltage variation and variations in voltage of the direct current energy supply.

The system employs a pair of transistors having a common collector resistor. One of the transistors is overdriven by an alternating exciting voltage to generate a rectangular wave the amplitude of which depends upon the collector current of the other transistor. The fundamental of this wave is filtered out and used to drive a power amplifier providing the output voltage of the system. A feature of the invention is the derivation from the output voltage of a constant amplitude rectangular wave the fundamental of which serves as a constant amplitude sinusoidal reference voltage having the same frequency as the output voltage and opposite in phase. This is compared with a fraction of the output voltage and any difference in their amplitudes results in a residual sinusoidal voltage the amplitude of which is directly related to the magnitude of the difference and the phase of which indicates the sign of the difference. This residual voltage is amplified and applied to a phase sensitive rectifier to which the output voltage is also supplied as a reference phase. The output of this rectifier is then used to control the collector current in the second of the earlier mentioned pair of transistors and thereby to control the amplitude of the rectangular wave generated by the other transistor of the pair. The control is in such direction as to maintain the above mentioned fraction of the output voltage in substantial equality with the constant amplitude sinusoidal reference voltage.

A more detailed description of the invention will be given with reference to the specific embodiment thereof shown schematically in the single figure of the drawing.

Referring to the drawing, the regulator operates to make the voltage at output terminal 1 independent of load impedance, the A.C. input voltage at terminal 2 and the D.C. supply voltage for the system within wide limits. The frequency of the exciting signal at terminal 2 determines the frequency of the output voltage. The system shown is intended primarily for relatively high frequency power supplies, for example 4800 c./s. at 110 volts RMS, although the principle may be employed over a wide range of frequencies. The amplitude of the voltage at terminal 2 is not important provided it is sufficient to adequately overdrive the first transistor 3, about 1 volt RMS in the system shown.

The amplitude of the output voltage is controlled by controlling the amplitude of a rectangular wave developed at the collector of transistor 3 by overdriving this transistor. The positive half cycles of the A.C. signal, which is applied to the base, saturate the transistor ond establish the collector potential at substantially zero or ground potential. The negative half cycles cut the transistor off causing the collector potential to rise to a value determined by the current flow in the common collector resistor 4 due to transistor 5. Therefore, by controlling the collector current of transistor 5, in a manner to be described later, the magnitude of the rectangular wave at the collector of transistor 3 is controlled, which ultimately controls the output voltage of the regulator.

This rectangular wave is coupled through emitter follower 6 to a low pass filter 7 which passes only the fundamental frequency of the wave. The sinusoidal output of this filter, which has the same frequency as the voltage at input terminal 2, is coupled through emitter follower 8 to the primary of input transformer 9 for a push-pull power amplifier driver stage comprising transistors 10 and 11. This stage drives the common collector push-pull power amplifier stage incorporating transistors 12 and 13 for supplying A.C. energy to the load.

Describing now the circuit for controlling the collector current in transistor 5, the output voltage of the regulator is applied across a potential divider, made up of resistors 14, 15 and 16, and through current limiting resistor 17 to the base of transistor 18. A constant direct voltage for this transistor is provided at point 19 by resistor 20 and zener diodes 21 and 22. The alternating output voltage applied to the base of transistor 18 overdrives this transistor so that a rectangular wave, of the same fundamental frequency as the output voltage, is produced at the collector. The positive half cycles of the applied voltage saturate the transistor and lower the collector potential substantially to zero or ground potential thus establishing the minimum value of the rectangular wave. The negative half cycles of the applied alternating voltage cut off the transistor allowing the collector voltage to rise to the breakdown voltage for zener diode 23, thus establishing the maximum value of the rectangular wave. In this manner the amplitude of the rectangular wave is made independent of the output voltage of the regulator. The rectangular wave has a fundamental frequency equal to the output voltage frequency and is in phase opposition to the output voltage wave.

The rectangular wave at the collector of transistor 18 and a reduced output voltage from potentiometer 15 are applied through resistors 24 and 25, respectively, to point 26 where they add. The resultant wave is similar to that illustrated. Since the output voltage and the fundamental of the rectangular wave are in phase opposition, the amplitude of the fundamental frequency component in the resultant wave is equal to the difference between the fundamental of the rectangular wave and the fraction of the output voltage applied to point 26. If the two are exactly equal the amplitude of the fundamental frequency component is zero. If not equal, the fundamental frequency component is present and its phase is that of the greater of the two sine waves. Therefore, the amplitude and phase of the fundamental frequency component at point 26 indicate the magnitude and direction of the departure of the output voltage from the value that would reduce the fundamental component to zero. This value may be set over a ange of voltages by changing the setting of potentiometer 15. Capacitor 34 corrects for undesired phase shifts due to inherent circuit capacitances.

The A.C. components of the wave at point 26 are coupled by emitter follower stage 27 to a low pass filter comprising elements 28 and 29. The filter passes the fundamental but rejects the higher harmonics. The fundamental is amplified in transistor stage 30, the supply voltage for which is held constant by zener diode 31, and in transistor stage 32 before application to the primary of transformer 33 which is part of a phase sensitive rectifier 35. The output voltage at terminal 1 is applied to the primary of transformer 36 of rectifier 35.

To explain the operation of rectifier 35, first assume that the amplitude of the output voltage at terminal 1 is such that the fraction thereof applied to point 26 through potentiometer 15 is exactly equal to the fundamental frequency component of the rectangular wave at this point. Under these conditions, as previously explained, the fundamental is cancelled and, consequently, the energization of transformer 33 in the rectifier circuit 35 is zero. With the alternating voltage across the secondary of transformer 33 zero, the full voltage of the secondary of transformer 36 acts through diodes 37 and 38 to produce a full wave rectification of this voltage across resistor 39, capacitors 40 and 41 and resistor R acting as a ripple filter. The voltage across resistor 39 determines the base potential of transistor 5 and thereby controls the amplitude of the rectangular wave at point 42 by controlling the maximum collector potential of transistor 3, as previously explained. For a given regulator output voltage, and for zero input to transformer 33, the value of the direct voltage across resistor 39 is determined by such factors as the turns ratio of transformer 36, the voltage drop within the rectifier network and the value of resistor R. The system should be so designed and adjusted that for a given regulator output and with potentiometer 15 set for zero energization of transformer 33, the voltage across resistor 39 is that required to provide the given output voltage.

The system operates to automatically maintain the fraction of the regulator output voltage appearing at point 26 in substantial equality with the fundamental of the rectangular wave at that point. If, for example, the output voltage should tend to fall, the fraction thereof at point 26 would not completely cancel the fundamental at that point with the result that a voltage of the same frequency as the output voltage but opposite in phase thereto is applied to the input of transistor 27. Other harmonics of the rectangular wave are also applied but these are later removed by filter 28–29 as previously pointed out. The fundamental frequency signal, after amplification by transistors 30 and 32, is applied to the primary of transformer 33. The polarity of this transformer is made such that the resulting secondary voltage is opposite in phase to and therefore subtractive from the transformer 36 secondary voltage in the rectifier circuits. This condition exists when the upper ends of the two secondary windings have opposite polarities. This reduces the voltage across resistor 39 which in turn reduces the current in common collector resistor 4 and increases the amplitude of the rectangular wave at point 42 to oppose the fall in output voltage. A tendency for the output voltage to rise is counteracted in a similar manner. In this case the fraction of output voltage applied to point 26 over cancels the fundamental of the rectangular wave leaving a residual wave of the same phase as the output voltage. In this case the transformer 33 introduces a voltage of the same phase as that provided by transformer 36 causing the potential across resistor 39 to rise. This increases the current in common collector resistor 4 which results in a reduction in the amplitude of the rectangular wave at point 42 to oppose the increase in output voltage.

The system therefore operates to hold the fraction of output voltage applied to point 26 substantially equal to the fundamental of the rectangular wave at this point, which is constant, thereby holding the output voltage substantially contant. The maximum error in output voltage depends upon the gain in the backward acting control circuit. This may be adjusted by changing resistor R. For maximum stiffness this resistor should be made as small as possible without permitting the circuit to oscillate. The output voltage may be adjusted by potentiometer 15. Adjusting this potentiometer upward so as to apply a larger fraction of the output voltage to point 26 lowers the ouput voltage and vice versa.

I claim:
1. A regulated alternating current power supply comprising: means for producing an alternating voltage the amplitude of which may be controlled by a direct control voltage; a power amplifier having an input and an output that serves as the power supply output; means for applying said controlled alternating voltage to the input of the power amplifier; a transistor connected in a common emitter configuration, having a load resistance in its collector circuit and having a zener diode connected between its collector and a point of reference potential, the breakdown voltage of said zener diode being less than the collector cutoff voltage relative to said reference point; means for applying the output voltage of said power amplifier between the base and emitter of said transistor for overdriving said transistor and producing a rectangular voltage wave at the collector having the collector saturation voltage and the zener diode breakdown voltage as its limits; means for adding a fraction of said output voltage to said rectangular wave to produce a resultant wave; means for deriving the component of output voltage frequency from said resultant wave; means for amplifying said component; a phase sensitive rectifier; means for applying said amplified component and said output voltage as inputs to said rectifier; and means for applying the output of said rectifier as a control voltage to said alternating voltage producing means.

2. A regulated alternating current power supply comprising: first and second transistors connected in a common emitter configuration with a common collector resistor; means for applying an alternating voltage between the base and emitter of said first transistor of sufficient amplitude to overdrive said transistor and produce collector saturation and collector cutoff in alternate half cycles, thus generating a rectangular voltage wave at the collector having an amplitude inversely related to the collector current of said second transistor; a power amplifier having an input circuit and an output circuit serving as the power supply output; means for deriving the fundamental frequency component from said rectangular wave and for applying said component to the input of said power amplifier; a third transistor connected in a common emitter configuration, having a load resistance in its collector circuit and having a zener diode connected between its collector and a point of reference potential, the breakdown voltage of said zener diode being less than the collector cutoff voltage relative to said reference point; means for applying the output voltage of said power amplifier between the base and emitter of said third transistor for overdriving said transistor and producing a rectangular voltage wave at the collector having the collector saturation voltage and the zener diode breakdown voltage as its limits; means for adding a fraction of said output voltage to said rectangular wave to produce a resultant wave; means for deriving the component of output voltage frequency from said resultant wave as an error signal; means for amplifying said error signal; a phase sensitive rectifier network having its direct voltage output applied as a control voltage between the base and emitter of said second transistor for controlling the second transistor collector current in said common collector resistor in proportion to the control voltage; means for applying said amplified error signal and said output voltage as inputs to said rectifier network, said network operating when said error signal is zero to produce a basic control voltage directly related to the amplitude of said output voltage and operating in the presence of an error signal to increase said basic control voltage when the error signal is in phase with said output voltage and to decrease said basic control voltage when in phase opposition, the change in basic control voltage in both cases, being directly related to the error signal amplitude.

References Cited
UNITED STATES PATENTS

| | | | |
|---|---|---|---|
| 3,128,438 | 4/1964 | Suda | 321—45 |
| 3,176,213 | 3/1965 | Klees | 321—45 |
| 3,237,081 | 2/1966 | Martin | 321—45 |

JOHN F. COUCH, *Primary Examiner.*

M. L. WACHTELL, *Assistant Examiner.*